(12) United States Patent
Fukasaku (10) Patent No.: US 9,343,940 B2
(45) Date of Patent: May 17, 2016

(54) MOTOR-DRIVEN COMPRESSOR HOUSING, COVER, AND SEAL

(71) Applicant: KABUSHIKI KAISHA TOYOTA JIDOSHOKKI, Kariya-shi, Aichi-ken (JP)

(72) Inventor: Hiroshi Fukasaku, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 284 days.

(21) Appl. No.: 13/899,031

(22) Filed: May 21, 2013

(65) Prior Publication Data

US 2013/0320792 A1 Dec. 5, 2013

(30) Foreign Application Priority Data

May 30, 2012 (JP) ................................ 2012-123269

(51) Int. Cl.
*H02K 5/10* (2006.01)
*H02K 5/22* (2006.01)
(Continued)

(52) U.S. Cl.
CPC ................ *H02K 5/22* (2013.01); *F04B 39/121* (2013.01); *H02K 5/10* (2013.01); *H02K 5/12* (2013.01); *H02K 11/022* (2013.01); *H02K 11/33* (2016.01)

(58) Field of Classification Search
CPC ... H02K 5/22; H02K 11/022; H02K 11/0073; H02K 11/0068; H02K 5/12; H02K 5/10; H02K 11/02; H02K 5/04; H02K 5/06; H02K 5/225; H02K 11/0094; F04B 39/121

USPC ............................................ 310/87, 88, 68 D
See application file for complete search history.

(56) References Cited

U.S. PATENT DOCUMENTS 3,509,438 A * 4/1970 Kachuk ..................... 318/400.41
3,510,707 A * 5/1970 Latta ............................. 310/112
(Continued)

FOREIGN PATENT DOCUMENTS

CA    2668609 A1 * 9/2008    .............. F04B 39/12
CN    1626822 A    6/2005
(Continued)

OTHER PUBLICATIONS

Machine translation of JP2011-168180 corresponding to WO 2011/101946 A1.*

(Continued)

*Primary Examiner* — Thomas Truong
(74) *Attorney, Agent, or Firm* — Sughrue Mion, PLLC (57) ABSTRACT

A motor-driven compressor is provided that includes a housing made of a metal material, a compression portion, an electric motor, a cover made of a metal material, a motor drive circuit accommodated in an accommodation space defined by the housing and the cover, an elastic sealing member located between the housing and the cover, and an extended portion provided in at least one of the housing and the cover. The compression portion and the electric motor are accommodated in the housing. The cover is attached to the housing. The motor driver circuit drives the electric motor. The extended portion extends in a direction toward an opposing one of the housing and the cover and is arranged inside the sealing member. The extended portion includes an outer peripheral surface. The sealing member is arranged to be in close contact with the outer peripheral surface of the extended portion.

7 Claims, 4 Drawing Sheets

(51) Int. Cl.
*H02K 5/12* (2006.01)
*H02K 11/02* (2016.01)
*F04B 39/12* (2006.01)

(56) References Cited

U.S. PATENT DOCUMENTS

| | | | | |
|---|---|---|---|---|
| 4,296,343 | A | * | 10/1981 | McMillen ................ 310/154.48 |
| 4,372,035 | A | * | 2/1983 | McMillen ........................ 29/596 |
| 4,626,723 | A | * | 12/1986 | McMillen ........................ 310/83 |
| 6,198,183 | B1 | * | 3/2001 | Baeumel ............... F04D 25/068 310/52 |
| 6,321,563 | B1 | * | 11/2001 | Ikeda ...................... F04B 49/06 184/6.16 |
| 2002/0041812 | A1 | | 4/2002 | Yokomachi et al. |
| 2003/0002998 | A1 | | 1/2003 | Makino et al. |
| 2004/0009078 | A1 | * | 1/2004 | Kimura ................. F04C 23/008 417/410.5 |
| 2004/0013543 | A1 | | 1/2004 | Kimura et al. |
| 2004/0071573 | A1 | * | 4/2004 | Pfetzer et al. ............. 417/423.15 |
| 2009/0010786 | A1 | | 1/2009 | Koide et al. |
| 2011/0175470 | A1 | | 7/2011 | Kinoshita et al. |
| 2012/0186869 | A1 | * | 7/2012 | Hamer et al. ................ 174/382 |
| 2013/0119834 | A1 | * | 5/2013 | Nakagami ............. F04B 39/121 310/68 D |

FOREIGN PATENT DOCUMENTS

| | | | | |
|---|---|---|---|---|
| CN | 101270751 | A | | 9/2008 |
| CN | 102128159 | A | | 7/2011 |
| EP | 1 197 687 | A2 | | 4/2002 |
| EP | 1 382 849 | A2 | | 1/2004 |
| GB | 2480137 | A | * | 9/2011 ............ H02K 11/02 |
| JP | 63138485 | U | | 9/1988 |
| JP | 07-119636 | A | | 5/1995 |
| JP | 2002-339867 | A | | 11/2002 |
| JP | 2002-364536 | A | | 12/2002 |
| JP | 2002-371968 | A | | 12/2002 |
| JP | 2007-224902 | A | | 9/2007 |
| JP | 2008082220 | A | | 4/2008 |
| JP | 2009-074517 | A | | 4/2009 |
| JP | 2011-168180 | | * | 9/2011 ............... B62M 6/55 |
| WO | WO 2011/101946 | A1 | * | 8/2011 ............... B62M 6/80 |
| WO | WO 2012056983 | A1 | * | 5/2012 ............ F04B 39/121 |

OTHER PUBLICATIONS

Machine Translation, Naito et al., JP 2008082220 A, Apr. 10, 2008.*
Communication dated Jul. 7, 2015, issued by the Japan Patent Office in corresponding Japanese Application No. 2012-123269.
Communication dated May 21, 2015, issued by the State Intellectual Property Office of P.R. China in counterpart Chinese application No. 201310203828.2.

* cited by examiner

MOTOR-DRIVEN COMPRESSOR HOUSING, COVER, AND SEAL

BACKGROUND OF THE INVENTION

The present invention relates to a motor-driven compressor.

A motor-driven compressor includes a housing made of a metal material, which accommodates a compression portion that compresses refrigerant and an electric motor that drives the compression portion. A cover is attached to the housing. The cover defines an accommodation space in which a motor drive circuit for driving the electric motor is accommodated. A sealing member is located between the housing and the cover. The sealing member prevents wastes or water from entering the accommodation space through an interface between the housing and the cover.

To obtain a sufficient seal between the housing and the cover, it is necessary to maintain the shape of the sealing member to conform to a peripheral edge of the accommodation space. Accordingly, for example, in a compressor as disclosed in Japanese Laid-Open Patent Publication No. 2007-224902, a metal core is shaped to conform to the peripheral edge of the accommodation space, and a sealing member configured by a sealing portion obtained by integrally forming an elastic rubber material with the metal core is located between the housing and the cover. According to this, the shape of the sealing portion is maintained to conform to the peripheral edge of the accommodation space. Accordingly, a sufficient seal is obtained between the housing and the cover by the sealing portion.

However, in the sealing member disclosed in Japanese Laid-Open Patent Publication No. 2007-224902, the sealing portion is formed by shaping the metal core to conform to the peripheral edge of the accommodation space, and then integrally forming the metal core with the rubber material. This increases the manufacturing costs and therefore is less preferable. Further, noise from the outside is likely to enter the motor drive circuit through the sealing portion to flow through the motor drive circuit, and the noise from the motor drive circuit is likely to leak outside through the sealing portion.

SUMMARY OF THE INVENTION

It is an object of the present invention to provide a motor-driven compressor in which a sufficient seal is obtained between a housing and a cover, and noise leakage through a sealing member is reduced, while reducing the manufacturing cost thereof.

To achieve the foregoing object and in accordance with one aspect of the present invention, a motor-driven compressor includes a housing made of a metal material; a compression portion and an electric motor accommodated in the housing; a cover made of a metal material attached to the housing; a motor drive circuit accommodated in an accommodation space defined by the housing and the cover; an elastic sealing member located between the housing and the cover; and an extended portion that is provided in at least one of the housing and the cover and extends in a direction toward the other one of the housing and the cover. The motor drive circuit drives the electric motor. The extended portion is arranged inside the sealing member and includes an outer peripheral surface. The sealing member is arranged to be in close contact with the outer peripheral surface of the extended portion.

In accordance with another aspect of the present invention, a motor-driven compressor includes a housing made of a metal material; a compression portion and an electric motor accommodated in the housing; a cover attached to the housing and configured by a plastic portion and a metal portion that intercepts electromagnetic noise; a motor drive circuit accommodated in an accommodation space defined by the housing and the cover; an elastic sealing member located between the housing and the cover; and an extended portion that is provided in at least one of the housing and the metal portion and extends in a direction toward the other one of the housing and the metal portion. The motor drive circuit drives the electric motor. The extended portion is arranged inside the sealing member and includes an outer peripheral surface. The sealing member is arranged to be in close contact with the outer peripheral surface of the extended portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Hereinafter, a motor-driven compressor according to a first embodiment will be described with reference to FIGS. 1A, 1B and 2.

Figure 1A:
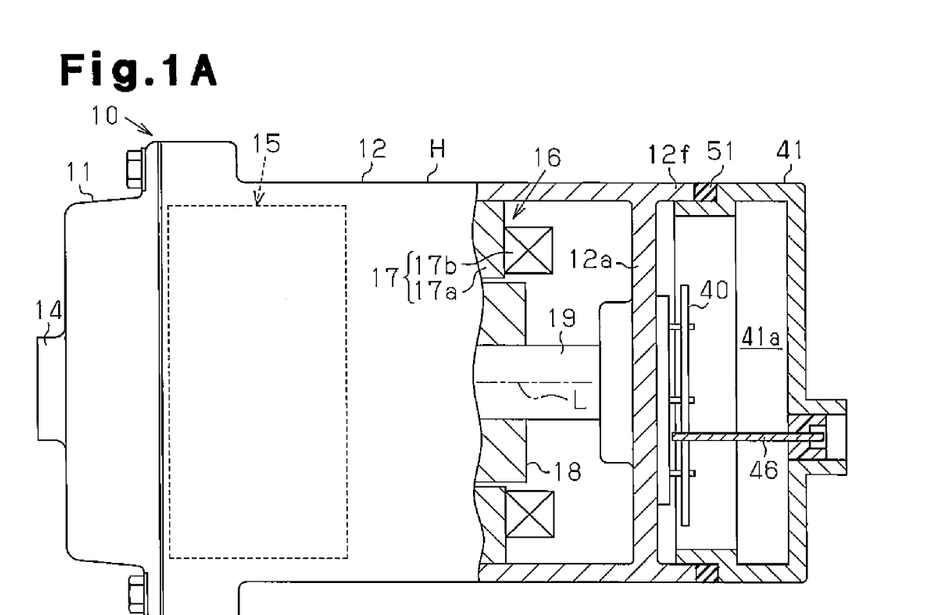
FIG. 1A is a cross-sectional view, with a part cut away, showing a motor-driven compressor according to a first embodiment.

As shown in FIG. 1A, a motor-driven compressor 10 has a housing H. The housing H includes a discharge housing member 11 made of aluminum (made of a metal material) and a suction housing member 12 made of aluminum (made of a metal material) joined to the discharge housing member 11. The discharge housing member 11 is shaped as a cylinder with a closed upper portion. The suction housing member 12 is shaped as a cylinder with a closed bottom portion. A suction port (not shown) is formed in a peripheral wall of the suction housing member 12 and the suction port is connected to an external refrigerant circuit (not shown). A discharge port 14 is formed in the discharge housing member 11, and the discharge port 14 is connected to the external refrigerant circuit. The suction housing member 12 accommodates a compression portion 15 for compressing refrigerant and an electric motor 16 for driving the compression portion 15. Although not particularly illustrated in the present embodiment, the compression portion 15 includes a fixed scroll, which is fixed to the suction housing member 12, and an orbiting scroll, which is arranged to face the fixed scroll.

A stator 17 is fixed to the inner circumferential surface of the suction housing member 12. The stator 17 includes a stator core 17a fixed to the inner circumferential surface of the suction housing member 12, and a coil 17b wound about each of teeth (not shown) of the stator core 17a. A rotary shaft 19 is rotationally supported in the suction housing member 12 in a state in which the rotary shaft 19 is inserted through the stator 17. The rotary shaft 19 is secured to a rotor 18.

Figure 1B:
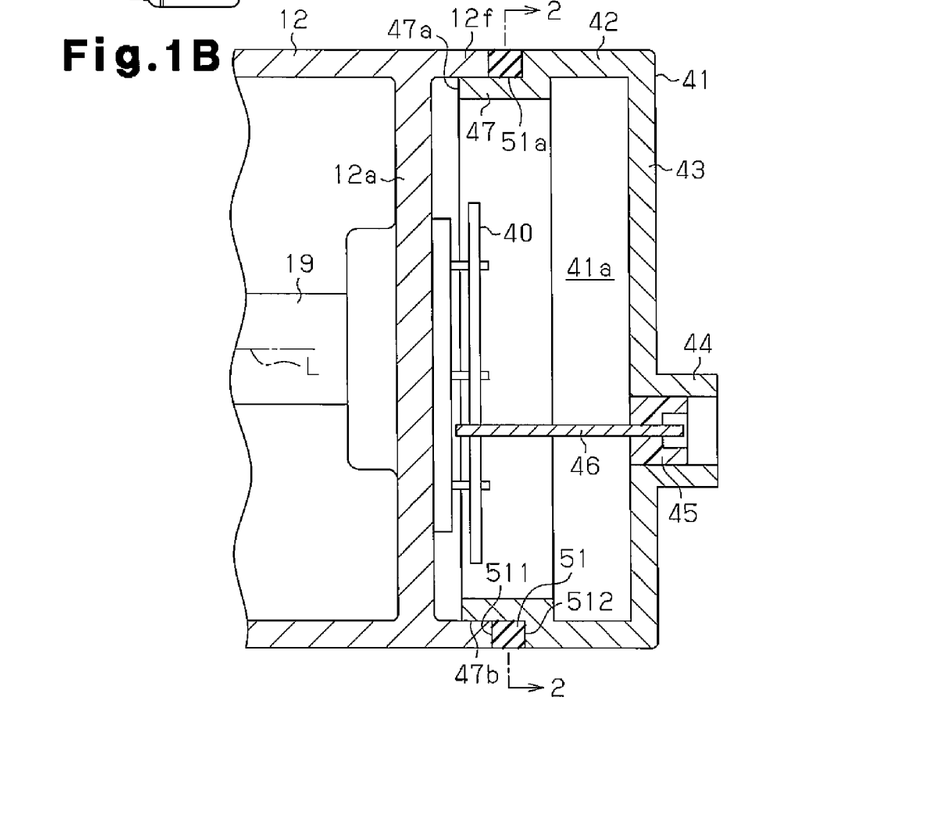
FIG. 1B is a partially enlarged cross-sectional view showing a cover and its surrounding of the motor-driven compressor of FIG. 1A.

As shown in FIG. 1B, an annular extension 12f is formed in a bottom wall 12a of the suction housing member 12. The extension 12f extends outward (rightward as viewed in FIG. 1B) from the whole peripheral circumference of the bottom wall 12a in a direction in which the axial center L of the rotary shaft 19 extends (axial direction). A cylindrical cover 41 made of aluminum (made of a metal material) with a closed end is attached to an opening end of the extension 12f. Further, accommodation space 41a is defined by the bottom wall 12a, the extension 12f, and the cover 41. The accommodation space 41a accommodates a motor drive circuit 40, which drives the electric motor 16. The motor drive circuit 40 is attached to the bottom wall 12a in the accommodation space 41a. Accordingly, in the present embodiment, the compression portion 15, the electric motor 16, and the motor drive circuit 40 are arranged in this order in the axial direction of the rotary shaft 19.

The cover 41 is formed by an annular cylindrical portion 42, a lid portion 43, and an annular connector portion 44. The cylindrical portion 42 extends in the axial direction of the rotary shaft 19. The lid portion 43 is continuous with the cylindrical portion 42 and extends in a direction perpendicular to a direction in which the cylindrical portion 42 extends. The connector portion 44 is continuous with the lid portion 43 and extends in the axial direction of the rotary shaft 19. Inside the connector portion 44, a holding portion 45 made of a plastic material is integrally formed with the connector portion 44. A metal terminal 46 that is electrically connected to an external power supply (not shown) is held by the holding portion 45. The metal terminal 46 is electrically connected to the motor drive circuit 40.

A sealing member 51 made of an elastic rubber material is located between the opening end of the extension 12f and the opening end of the cylindrical portion 42. The sealing member 51 is annular. Further, an annular extended portion 47, which extends from the cylindrical portion 42 toward the bottom wall 12a (suction housing member 12), is provided in an inner peripheral surface in the vicinity of the opening end of the cylindrical portion 42. The extended portion 47 is integrally formed with the cylindrical portion 42 and linearly extends in the axial direction of the rotary shaft 19. A tip end 47a of the extended portion 47 protrudes further toward the bottom wall 12a than an end surface 511 of the sealing member 51 that faces the extension 12f does. That is, the extended portion 47 extends toward a position at which the extended portion 47 covers at least a whole inner peripheral surface 51a of a sealing member 51.

Figure 2:
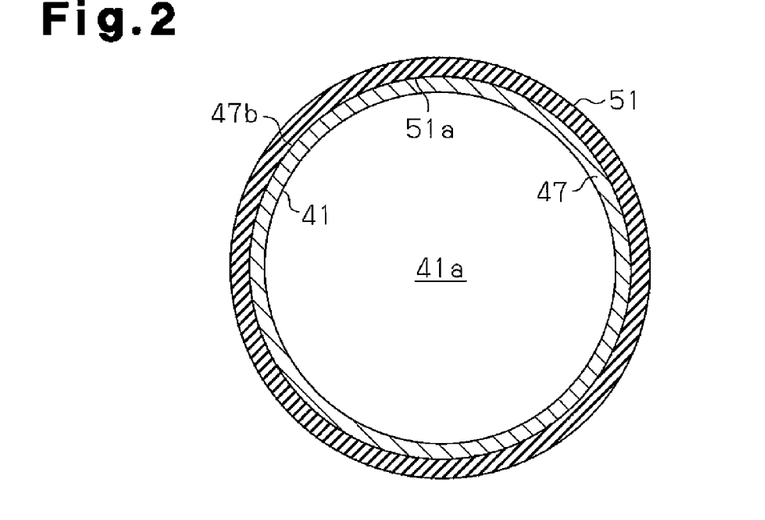
FIG. 2 is a cross-sectional view taken along line 2-2 of FIG. 1B.

As shown in FIG. 2, the extended portion 47 is formed such that it contacts the whole inner peripheral surface 51a of the sealing member 51. An outer peripheral surface 47b of the extended portion 47 contacts the inner peripheral surface 51a of the sealing member 51. The sealing member 51 is installed on the periphery of the extended portion 47 by being elastically deformed radially outward. The outer peripheral surface 47b of the extended portion 47 contacts the inner peripheral surface 51a of the sealing member 51 so that the sealing member 51 is arranged to be in close contact with and along the outer peripheral surface 47b of the extended portion 47. The sealing member 51 is thus maintained to be shaped to conform to the outer peripheral surface 47b of the extended portion 47 (a peripheral edge of the accommodation space 41a). That is, the outer peripheral surface 47b of the extended portion 47 and the inner peripheral surface 51a of the sealing member 51 are arranged to be in close contact with each other to maintain at least the sealing member 51 to be shaped to conform to the outer peripheral surface 47b of the extended portion 47. The inner diameter of the sealing member 51 prior to the elastic deformation is smaller than the outer diameter of the extended portion 47.

Next, an operation of the present embodiment will be described.

The sealing member 51 is arranged to be in close contact with and along the outer peripheral surface 47b of the extended portion 47 so that the sealing member 51 is maintained to be shaped to conform to the outer peripheral surface 47b of the extended portion 47. Accordingly, a sufficient seal is obtained between the opening end of the extension 12f and the opening end of the cylindrical portion 42 by the sealing member 51. This prevents wastes or water from entering the accommodation space 41a through an interface between the opening end of the extension 12f and the cylindrical portion 42. Further, the extended portion 47 is arranged inside the sealing member 51 so that the tip end 47a of the extended portion 47 protrudes further toward the bottom wall 12a than the end surface 511 of the sealing member 51, which faces the extension 12f, does. Accordingly, noise from the outside through the sealing member 51 (electromagnetic noise) is intercepted by the extended portion 47 and noise from the motor drive circuit 40 toward the sealing member 51 is intercepted by the extended portion 47 as well. Accordingly, the noise leakage through the sealing member 51 is reduced.

The above described embodiment has the following advantages.

(1) The annular extended portion 47, which extends from the cylindrical portion 42 toward the bottom wall 12a and is arranged inside the sealing member 51, is provided in the inner peripheral surface in the vicinity of the opening end of the cylindrical portion 42. Further, the sealing member 51 is arranged to be in close contact with and along the outer peripheral surface 47b of the extended portion 47. Accordingly, the sealing member 51 is maintained to be shaped to conform to the outer peripheral surface 47b of the extended portion 47 so that a sufficient seal is obtained between the opening end of the extension 12f and the opening end of the cylindrical portion 42 by the sealing member 51. Since it is not necessary to use a conventional sealing member, a manufacturing cost is reduced.

The outer peripheral surface 47b of the extended portion 47 and the inner peripheral surface 51a of the sealing member 51 may be arranged to be in close contact with each other in any manner as long as at least the sealing member 51 is maintained to be shaped to conform to the outer peripheral surface 47b of the extended portion 47. Further, when the outer peripheral surface 47b of the extended portion 47 contacts the whole inner peripheral surface 51a of the sealing member 51, the shape of the sealing member 51 is most easily maintained.

Moreover, the extended portion 47 is arranged inside the sealing member 51. Accordingly, in comparison to a case in which the extended portion 47 is not arranged inside the sealing member 51, noise from the outside through the sealing member 51 is more easily intercepted by the extended portion 47 and noise from the motor drive circuit 40 toward the sealing member 51 is more easily intercepted by the extended portion 47 as well. Accordingly, the noise leakage through the sealing member 51 is reduced.

(2) Since the extended portion 47 extends toward a position at which the extended portion 47 covers at least the inner peripheral surface 51a of the sealing member 51, the noise leakage through the sealing member 51 is further reduced.

(3) The extended portion 47 is integrally formed with the cylindrical portion 42. Accordingly, the extended portion 47 is formed simultaneously with the cylindrical portion 42. Therefore, the extended portion 47 is easily formed in the cylindrical portion 42.

(4) The extended portion 47 is formed over the whole inner peripheral surface 51a of the sealing member 51. Accordingly, in comparison to a case in which the extended portion 47 is provided over a part of the inner peripheral surface 51a of the sealing member 51, the noise leakage through the sealing member 51 is easily reduced.

(5) The extended portion 47 is arranged inside the sealing member 51. Accordingly, in comparison to a case in which the extended portion 47 is arranged outside the sealing member 51, the sealing member 51 is more easily reduced from shifting inward.

(6) The extended portion is not arranged outside the sealing member 51. Thus, in the motor-driven compressor 10, the shape of the outer peripheral portion of the housing H and the shape of the outer peripheral portion of the cover 41 are not complicated.

Second Embodiment

A motor-driven compressor according to a second embodiment will be described with reference to FIG. 3. The same components in the following embodiment as those in the first embodiment are given the same reference numerals and description thereof is omitted.

Figure 3:
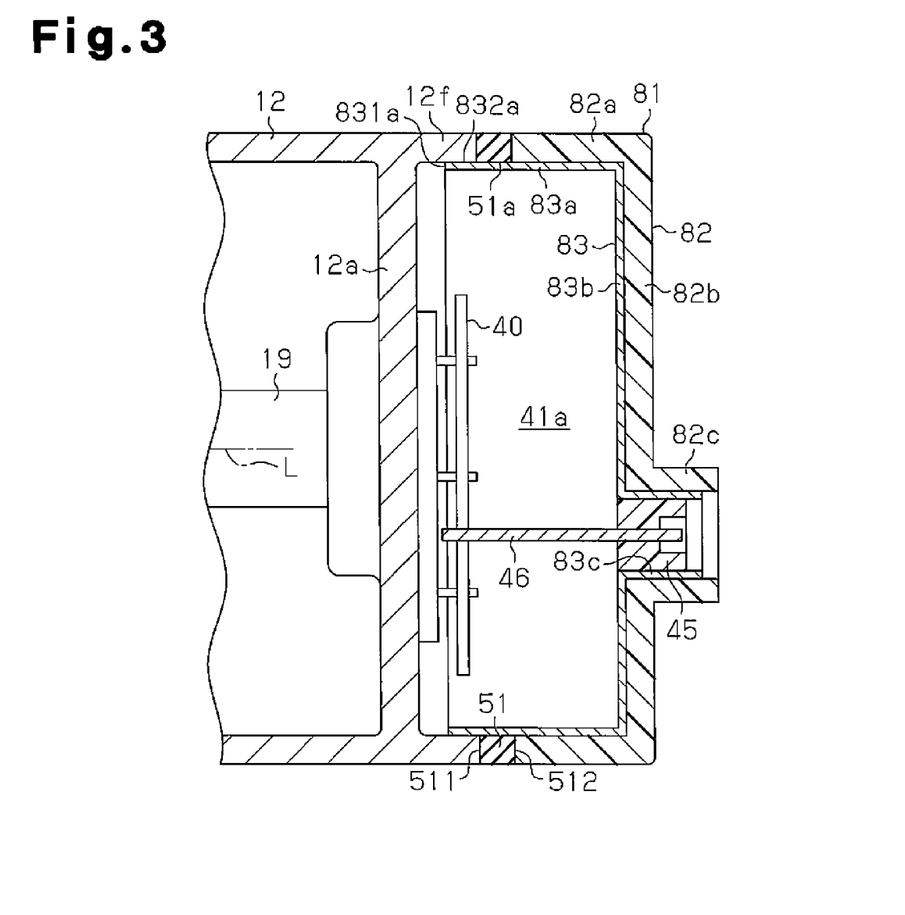
FIG. 3 is a partially enlarged cross-sectional view showing a surrounding of a cover according to a second embodiment.

As shown in FIG. 3, a cover 81 is formed by a plastic portion 82 and a thin plate metal portion 83 made of aluminum (made of a metal material). The plastic portion 82 is shaped as a cylinder with a closed end and configures a body of the cover 81. The cover 81 is molded by a plastic material using the metal portion 83 as a core. The metal portion 83 is arranged inside the plastic portion 82.

The plastic portion 82 includes an annular outer cylindrical portion 82a, an outer lid portion 82b, and an annular outer connector portion 82c. The outer cylindrical portion 82a extends in the axial direction of the rotary shaft 19. The outer lid portion 82b is continuous to the outer cylindrical portion 82a and extends in a direction perpendicular to a direction in which the outer cylindrical portion 82a extends. The outer connector portion 82c is continuous with the outer lid portion 82b and extends in the axial direction of the rotary shaft 19.

The metal portion 83 includes an annular inner cylindrical portion 83a, an inner lid portion 83b, and an annular inner connector portion 83c. The inner cylindrical portion 83a extends in an axial direction of a rotary shaft 19. The inner lid portion 83b is continuous with the inner cylindrical portion 83a and extends in a direction perpendicular to a direction in which the inner cylindrical portion 83a extends. The inner connector portion 83c is continuous with the inner lid portion 83b and extends in the axial direction of the rotary shaft 19. The inner cylindrical portion 83a extends along an inner peripheral surface of the outer cylindrical portion 82a of the plastic portion 82. The inner lid portion 83b extends along an inner bottom surface of the outer lid portion 82b of the plastic portion 82. The inner connector portion 83c extends along an inner peripheral surface of the outer connector portion 82c of the plastic portion 82. Accordingly, the metal portion 83 extends over the whole inner side of the plastic portion 82, and intercepts noise (electromagnetic noise) through the plastic portion 82.

A sealing member 51 is located between an opening end of an extension 12f and an opening end of the outer cylindrical portion 82a. The inner cylindrical portion 83a of the metal portion 83 extends toward a bottom wall 12a (suction housing member 12) and is arranged inside the sealing member 51. Accordingly, in the present embodiment, the inner cylindrical portion 83a corresponds to an extended portion arranged inside the sealing member 51, and the extended portion is provided in the metal portion 83. A tip end 831a of the inner cylindrical portion 83a protrudes further toward the bottom wall 12a than an end surface 511 of the sealing member 51 that faces the extension 12f does. That is, the inner cylindrical portion 83a extends toward a position at which the inner cylindrical portion 83a covers at least a whole inner peripheral surface 51a of the sealing member 51. A portion in the vicinity of the tip end 831a in an outer peripheral surface 832a of the inner cylindrical portion 83a contacts the inner peripheral surface of the extension 12f.

The inner cylindrical portion 83a is formed to contact the whole inner peripheral surface 51a of the sealing member 51. The outer peripheral surface 832a of the inner cylindrical portion 83a contacts the inner peripheral surface 51a of the sealing member 51. The sealing member 51 is installed about the periphery of the inner cylindrical portion 83a by being elastically deformed radially outward. The outer peripheral surface 832a of the inner cylindrical portion 83a contacts the inner peripheral surface 51a of the sealing member 51 so that the sealing member 51 is arranged to be in close contact with and along the outer peripheral surface 832a of the inner cylindrical portion 83a, and the sealing member 51 is maintained to be shaped to conform to a peripheral edge of accommodation space 41a.

Therefore, according to the second embodiment, in addition to the advantages the same as those (1) to (6) of the first embodiment, the following advantages are obtained.

(7) Since a part of the cover 81 is made of a plastic material, the weight of the cover 81 is reduced in comparison to a cover made of a metal material.

The above described embodiments may be modified as follows.

Figure 4:
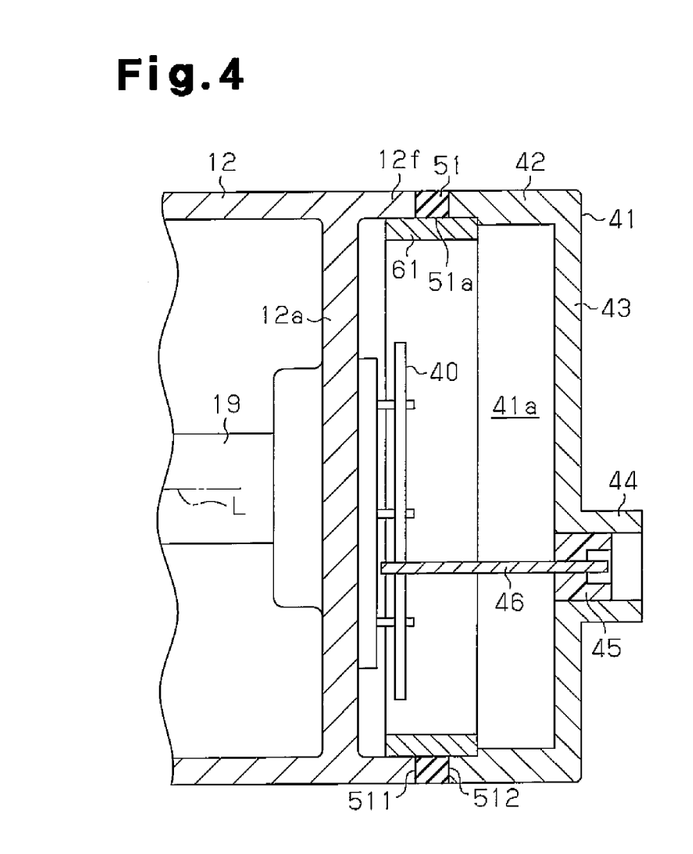
FIG. 4 is a partially enlarged cross-sectional view showing a surrounding of a cover according to another embodiment.

As shown in FIG. 4, a cylindrical member 61 corresponding to the extended portion may be provided separately from the suction housing member 12 and the cover 41. The cylindrical member 61 is press-fitted into the cylindrical portion 42 of the cover 41 to be attached to the cylindrical portion 42. The cylindrical member 61 may be press-fitted into the inner side of the extension 12f to be attached to the extension 12f. For example, in some cases, the shape of the suction housing member 12 or the cover 41 is complicated so that it is difficult to integrally form the extended portion with the suction housing member 12 or the cover 41. In such cases, by forming the cylindrical member 61 separately from the suction housing member 12 or the cover 41, the cylindrical member 61 corresponding to the extended portion can be easily provided.

Figure 5:
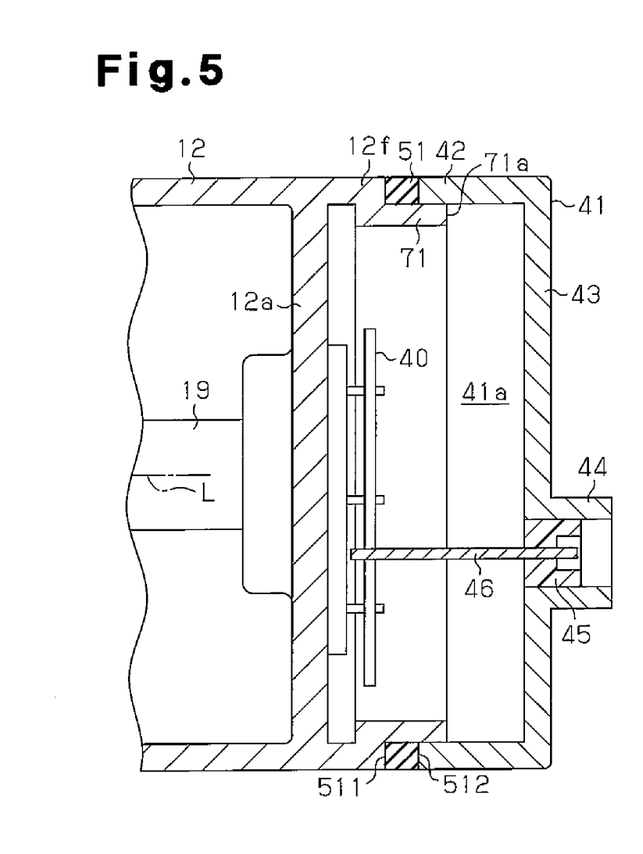
FIG. 5 is a partially enlarged cross-sectional view showing a surrounding of a cover according to yet another embodiment.

In the first embodiment, as shown in FIG. 5, an annular extended portion 71, which extends from the bottom wall 12a toward the cover 41 and is arranged inside the sealing member 51, may be provided in the inner peripheral surface in the vicinity of the opening end of the extension 12f. The extended portion 71 is integrally formed with the extension 12f. A tip end 71a of the extended portion 71 protrudes further toward the lid portion 43 of the cover 41 than an end surface 512 of the sealing member 51 that faces the cylindrical portion 42 does. The tip end 71a of the extended portion 71 may extend to the same position as that of the end surface 512 of the sealing member 51, which faces the cylindrical portion 42.

Figure 6:
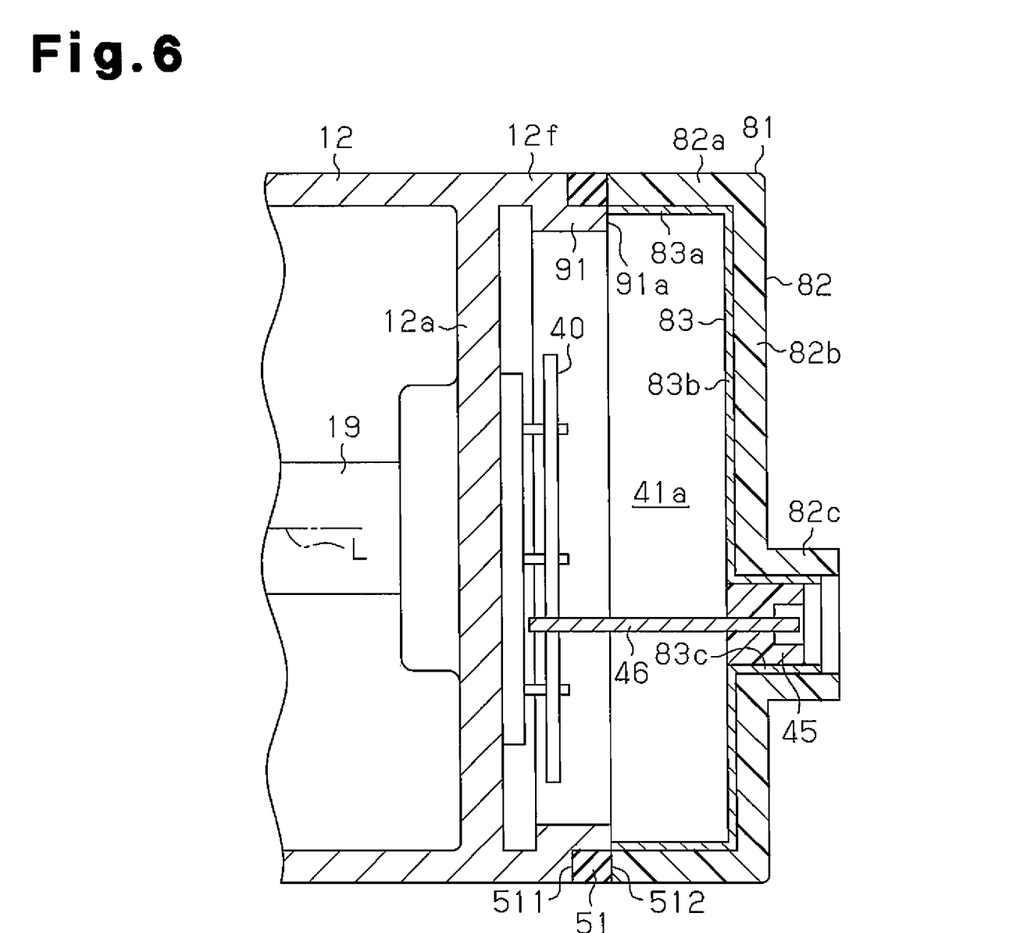
FIG. 6 is a partially enlarged cross-sectional view showing a surrounding of a cover according to yet another embodiment.

In the second embodiment, as shown in FIG. 6, an annular extended portion 91, which extends from the bottom wall 12a toward the cover 81 and is arranged inside the sealing member 51, may be provided in the inner peripheral surface in the vicinity of the opening end of the extension 12f. The extended portion 91 is integrally formed with the extension 12f. A tip end 91a in a direction in which the extended portion 91 extends to the same position as that of the end surface 512 of the sealing member 51 facing the outer cylindrical portion 82a. The tip end 91a in a direction in which the extended portion 71 extends may protrude further toward the outer lid portion 82b than the end surface 512 of the sealing member 51 facing the outer cylindrical portion 82a does.

In each of the above described embodiments, the extended portion may be formed at a part in the vicinity of the opening end of the cylindrical portion 42 or the inner cylindrical portion 83a. In the vicinity of the opening end of the extension 12f, another extended portion may be formed such that it does not overlap with the extended portion formed at the part in the vicinity of the opening end of the cylindrical portion 42 or the inner cylindrical portion 83a. That is, each extended portion may be formed in the suction housing member 12 and the cover 41 or 81.

In each of the above described embodiments, the tip end 47a of the extended portion 47 or the tip end 831a of the inner cylindrical portion 83a may extend to the same position as that of the end surface 511 of the sealing member 51 facing the extension 12f.

In each of the above described embodiments, the tip end 47a of the extended portion 47 or the tip end 831a of the inner cylindrical portion 83a need not extend to the same position as that of the end surface 511 of the sealing member 51 facing the extension 12f.

In the embodiment shown in FIG. 4, the tip end of the cylindrical member 61 need not extend to the same position as that of the end surface 511 of the sealing member 51 facing the extension 12f.

In the embodiments shown in FIGS. 5 and 6, the tip end 71a of the extended portion 71 and the tip end 91a of the extended portion 91 need not extend to the same position as that of the end surface 512 of the sealing member 51 facing the cylindrical portion 42 or 82a.

In each of the above described embodiments, the extended portion 47 or the inner cylindrical portion 83a need not linearly extend in the axial direction of the rotary shaft 19. For example, a part of the extended portion 47 or the inner cylindrical portion 83a may be flexed.

In each of the above described embodiments, the extended portion 47 or the inner cylindrical portion 83a may be formed at a part of the inner peripheral surface 51a of the sealing member 51. In this case, the extended portion 47 or the inner cylindrical portion 83a may be formed on any part in which the sealing member 51 is maintained to be shaped to conform to the circumferential edge of the accommodation space 41a, which part is susceptible to the noise.

In each of the above described embodiments, the motor drive circuit 40 may be attached to the cover 41 or 81 in the accommodation space 41a.

In each of the above described embodiments, the cover 41 or 81 may be attached to the outer peripheral surface of the suction housing member 12, for example.

In the second embodiment, the metal portion 83 may be formed of a conductive material such as iron and copper.

In each of the above illustrated embodiments, the shapes of the housing H and the covers 41 and 81 are not particularly limited. For example, in the first embodiment, the cover 41 may be substantially shaped as a cover configured by the lid portion 43 without the cylindrical portion 42, and the extended portion 47 may be directly formed on the lid portion 43. For example, in the embodiment shown in FIG. 5, the extended portion 71 may be directly formed in the bottom wall 12a without forming the extension 12f in the suction housing member 12.

Although the compression portion 15, the electric motor 16, and the motor drive circuit 40 are arranged in this order in the axial direction of the rotary shaft 19 in each of the above illustrated embodiments, the order of the arrangement is not limited to this. For example, the motor drive circuit, the compression portion, and the electric motor may be arranged in this order in the axial direction of the rotary shaft 19.

In each of the above illustrated embodiments, the compression portion 15 may be of a piston type or of a vane type, for example.

Therefore, the present examples and embodiments are to be considered as illustrative and not restrictive and the invention is not to be limited to the details given herein, but may be modified within the scope and equivalence of the appended claims.

I claim:

1. A motor-driven compressor, comprising:
a metal housing;
a compression portion and an electric motor accommodated in the housing;
a metal cover attached to the housing;
a motor drive circuit accommodated in an accommodation space defined by the housing and the cover, wherein the motor drive circuit drives the electric motor;
the housing including a bottom wall facing the accommodation space, and an annular extension from a whole peripheral circumference of the bottom wall in a direction toward the cover, the annular extension having an opening end;
the cover including a lid portion and a cylindrical portion extending from a whole peripheral circumference of the lid portion in a direction toward the housing, the cylindrical portion having an opening end;
an elastic sealing member located between the opening end of the annular extension of the housing and the opening end of the cylindrical portion of the cover, so that a first end surface of the elastic sealing member contacts the opening end of the annular extension and a second end surface of the elastic sealing member contacts the opening end of the cylindrical portion; and
an extended portion that is provided in at least one of the housing and the cover and extends in a direction toward the other one of the housing and the cover, wherein the extended portion is arranged inside the sealing member and includes an outer peripheral surface,
wherein the sealing member is annular and is arranged on the periphery of the extended portion by being elastically deformed radially outward such that the sealing member is in contact with the outer peripheral surface of the extended portion, and
wherein a tip end of the extended portion protrudes further toward the other one of the housing and the cover than an end surface of the sealing member that faces the other one of the housing and the cover, and a portion of the outer peripheral surface of the extended portion overlaps with an inner peripheral surface of the other one of the housing and the cover.

2. The motor-driven compressor according to claim 1, wherein the sealing member includes an inner peripheral surface, and the extended portion extends to a position at which the extended portion covers at least the inner peripheral surface of the sealing member.

3. The motor-driven compressor according to claim 1, wherein the extended portion is integrally formed with at least one of the housing and the cover.

4. The motor-driven compressor according to claim 1, wherein the extended portion is formed separately from at least one of the housing and the cover.

5. The motor-driven compressor according to claim 1, wherein the sealing member includes an inner peripheral surface, and the extended portion is provided over the whole inner peripheral surface of the sealing member.

6. The motor-driven compressor according to claim 1, further comprising:
   a rotor accommodated in the housing, the rotor configuring the electric motor; and
   a rotary shaft accommodated in the housing, the rotary shaft rotating integrally with the rotor,
   wherein the compression portion, the electric motor, and the motor drive circuit are arranged in this order in an axial direction of the rotary shaft.

7. A motor-driven compressor, comprising:
   a housing made of a first metal material;
   a compression portion and an electric motor accommodated in the housing;
   a cover attached to the housing and configured by a plastic portion and a metal portion that intercepts electromagnetic noise;
   a motor drive circuit accommodated in an accommodation space defined by the housing and the cover, wherein the motor drive circuit drives the electric motor;
   the housing including a bottom wall facing the accommodation space, and an annular extension from a whole peripheral circumference of the bottom wall in a direction toward the cover, the annular extension having an opening end;
   the cover including a lid portion and a cylindrical portion extending from a whole peripheral circumference of the lid portion in a direction toward the housing, the cylindrical portion having an opening end;
   an elastic sealing member located between the opening end of the annular extension of the housing and the opening end of the cylindrical portion of the cover, so that a first end surface of the elastic sealing member contacts the opening end of the annular extension and a second end surface of the elastic sealing member contacts the opening end of the cylindrical portion; and
   an extended portion that is provided in at least one of the housing and the metal portion and extends in a direction toward the other one of the housing and the metal portion, wherein the extended portion is arranged inside the sealing member and includes an outer peripheral surface,
   wherein the sealing member is annular and is arranged on the periphery of the extended portion by being elastically deformed radially outward such that the sealing member is in contact with the outer peripheral surface of the extended portion,
   wherein a ti end of the extended portion extends further toward the bottom wall than an end surface of the sealing member that faces the annular extension of the housing, and an outer peripheral surface of the extended portion contacts the inner peripheral surface of the annular extension.

* * * * *